United States Patent Office 3,349,900
Patented Oct. 31, 1967

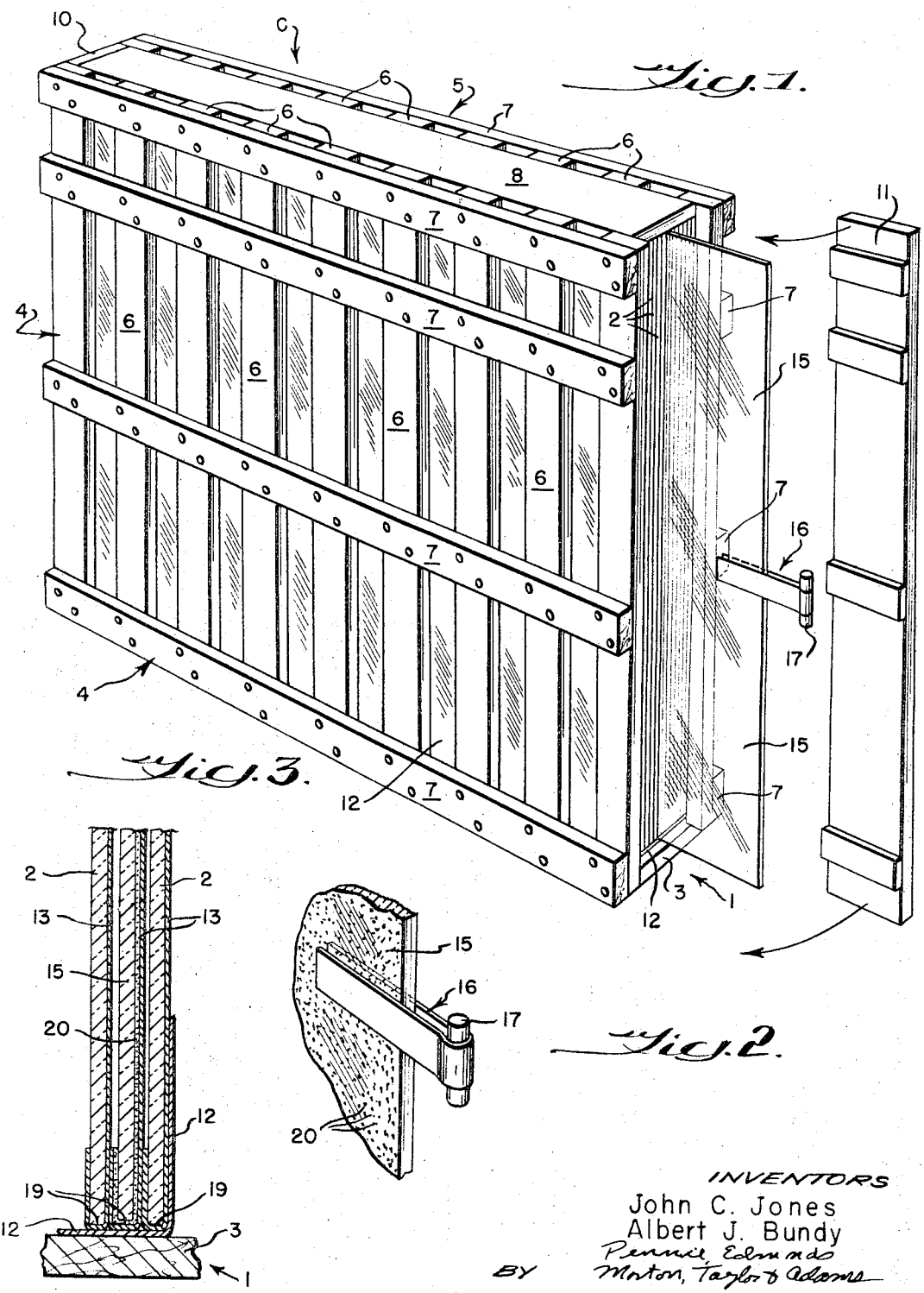

3,349,900
PACKAGED PLATE GLASS
John C. Jones and Albert J. Bundy, Kingsport, Tenn., assignors to American Saint Gobain Corporation, Kingsport, Tenn., a corporation of Delaware
Filed Dec. 30, 1965, Ser. No. 517,665
10 Claims. (Cl. 206—62)

ABSTRACT OF THE DISCLOSURE

A glass shipping case confining a plurality of glass sheets in side-by-side relationship therein with a lubricant material disposed on opposite sides of at least one of the glass sheets separating such sheet from the remaining sheets in the case.

---

This invention relates to packaged plate glass in which several plates of glass are secured together in a shipping case, and provides a shipping case openable at one end and lubricating means for the plates to facilitate their removal through the open end one-at-a-time.

Large plates of glass are shipped in wooden cases containing on the average from 10 to 20 plates. The typical individual plates may range in size from 60" x 130" to 60" x 240". Plate glass of this size is packed tightly within the wooden shipping cases to prevent breakage during handling and shipping. The plates are usually separated by sheets of interleaving paper which act as cushions and also prevent scratching of the glass surface.

Since the plates are quite large and heavy, they are awkward to handle and present unloading and storage difficulties in the common practice of removing the plates from the shipping case and placing them in a storage area.

In the present practice the case of plate glass delivered to a warehouse is first arranged in an upstanding position and then tilted back so as to rest on an angled support. The broad side of the case facing upwardly from the tilted position is removed and each individual plate of glass is then lifted from the tilted position, brought to a vertical position, placed on a dolly and taken to a conventional slot rack for storage. The disadvantages of this system are that it involves the labor of some two to four men to unload and store the glass, and additional warehouse area is necessary for separate storage racks to hold the plates until they are needed.

Because the plates are packed tightly and flush with each other to prevent damage during shipping, it is not possible to secure a hold on the first sheet to be removed and pull it out through an open end of the case. Such removal is further complicated because of the large dead weight of the glass and friction. Any attempt to slide one plate of glass out and away from the others, assuming such plates could be properly gripped, is made difficult by the friction on the surfaces of the plate and its friction on the supporting edge.

The present invention overcomes these disadvantages by providing a suitable lubricant such as an organic powdered material, preferably a dry lubricant of spherical particles which adhere to the glass, between the plates of glass which facilitates removal. Another feature of the invention is the provision of a pull tab secured to the glass plate first to be removed which enables the glass plate to be withdrawn far enough from the case that it may be gripped and removed by any suitable conventional means.

Another feature of the invention is the folding of the interleaving paper around the bottom edge of the glass plates so as to maintain or retain dry lubricant particles on the lower bearing edges, thus reducing friction at that point.

FIG. 1 is a perspective view of a case of glass of the invention;
FIG. 2 is a fragmentary view of a single sheet of the glass of FIG. 1 illustrating the use of a pull tab; and
FIG. 3 is a sectional end view of FIG. 1 with parts removed.

FIG. 1 illustrates a common type of case C formed of wooden boards or slats secured together in any suitable manner for shipping plate glass. The bottom 1 on which the glass plates 2 rest is formed either of cross rails 3 or a solid board. The two sides 4 and 5 which face the flat surfaces of the glass plates are formed of upright boards 6 which are reinforced with slats 7 nailed together and to the rails 3. The top end of the upright side boards 6 are nailed to the top board 8. The ends 10 and 11 of the case are formed of boards which are nailed to the top board 8 and to the rails 3 and steel straps or the like may be applied around the case if desired. The front end 11 of the case is removable and may accordingly be connected to the remaining part of the case so as to facilitate such removal to expose the ends of the glass plates.

As shown in FIGS. 1 and 3 the several pieces of plate glass are arranged side-by-side and are surrounded by a sheet of waxed paper 12 to protect the glass and interleaving sheets of paper 13 are placed between the adjacent glass plates. The glass plates are held tightly together within the case.

One interior plate of glass 15 which is arranged to be removed first through the open end of the case is provided with a pull tab 16, shown in detail in FIG. 2. The pull tab may be formed by folding a strip of fiber filament reinforced pressure sensitive tape of sufficient length and width to provide the required strength and shear value and to provide a loop into which a wooden dowel 17 or other similar device may be inserted, either by the supplier or the receiver. The two free ends of the tape are then adhesively secured to the surfaces of the glass plate 15 to provide a means for pulling the plate of glass from the case. Before this glass plate 15 is placed in the case C, the pull tab 16 is adhesively attached and any suitable lubricant is applied to the flat surfaces, preferably, as a coating of a powder consisting of organic spherical particles which are quite small in diameter and have the property of adhering to dry surfaces of the plate. Polystyrene fines are the presently preferred lubricant although talc, boric acid powder, or any similar material, of minute spherical configuration which does not adversely affect glass, may be used.

When the plate of glass 15, coated with the lubricant, is removed by pulling on the pull tab 16, the coating acts as a ball bearing type lubricant. Thus, the friction on the glass plate 15 caused by the weight of the plate glass sheets 2 and the tightness of the packing is substantially reduced so that it can be pulled laterally from between the adjacent glass plates 2 in the case.

The conventional method of packaging plates glass with interleaving paper sheets 13 is to have the lower edges of the sheets somewhat longer than the glass plates 2 and fold them around the bottom of the plates as shown in FIG. 3 forming channels 19 within which the glass plates rest. In the present invention the channels 19 act as collectors for the excess powder lubricant 20 that does not adhere to the flat glass surfaces and the bottom edges of the glass plates 2 ride on a bed of powdered lubricating material 20 which greatly reduces the frictional force at the lower edge of the glass plates, thereby allowing them to be more readily withdrawn laterally from the case during the unpacking operation.

In a typical packaging operation the plates of glass 2 are placed in the case C through open side 4 and arranged with alternate sheets of interleaving paper 13. When the case C is approximately half filled with the plates of glass 2, the plate of glass 15, selected to be removed first, is then prepared by attaching the pull tab 16. Both sides of the plate of glass 15 are then preferably coated with the organic powder lubricant 20 as by dusting, spraying or by any other convenient means. Alternatively, the paper or both the paper and the glass may be coated with lubricant.

The remainder of the case is then filled with the glass plates 2 and interleaving paper sheets 13. The side section 4 is then secured in any convenient manner, such as by nailing to close the case. After shipment the case is placed in a vertical storage positon, and is opened by removing the end 11 which may be accomplished by cutting the securing nails or by prying it free. This exposes the ends of the glass plates 2 including the glass plate 15. The glass plate 15 is initially withdrawn by pulling on tab 16 and this need only be far enough so a good grip can be obtained by glass holding tongs for the complete removal. The glass plate 15 is then cleaned to remove the organic lubricant as by wiping or any other convenient method and is ready for use.

Removal of this first glass plate 15 provides sufficient side-to-side room to single out and separate any other plate for removal. This separation can be facilitated by the use of small wedges which are easily inserted to provide space for the insertion of tongs.

While the above description is limited to the preparation of a single plate of glass for initial removal, it will be appreciated that any number or all of the plates of glass may be prepared for initial removal. This is particularly useful where a single glass case may contain a number of different sizes of plate glass and it is uncertain which size will be needed first. Each plate of different size may be tagged for identification and removed as hereinabove described. Thus, by utilizing the above method of removal of glass plates, the shipping case may be utilized as a storage container and the interim steps of removing the plate glass from the shipping case the storing it on a separate storage rack is eliminated.

We claim:

1. In a glass shipping case including a plurality of tightly packed glass plates and interleaving paper sheets placed therebetween, the improvement comprising a coating of dry lubricant positioned between at least one of said glass sheets and interleaving sheets.

2. The glass shipping case and glass plates of claim 1 wherein said coating is on both flat sides of at least one glass plate.

3. The glass shipping case and glass plates of claim 1 wherein said lubricant comprises fine polystyrene powder.

4. The glass shipping case and glass plates of claim 2 in which at least one plate has a pull tab secured to and extending from the plate glass.

5. The glass shipping case and glass plates of claim 4 wherein the pull tab is a strip of pressure sensitive tape whose center extending portion is looped for the insertion of a gripping element and whose end portions are secured to the said plate glass.

6. The glass shipping case and glass plates of claim 1 wherein the lower section of the interleaving sheet forms a channel under the lower supporting edge of the glass plate and contains a lubricated surface on which the glass plates ride.

7. In a glass shipping case for confining a plurality of glass sheets in side-by-side tightly packed relationship, the improvement comprising a lubricant material disposed on opposite sides of at least one of said glass sheets and separating said one sheet from the sheets positioned on opposite sides thereof.

8. In a glass shipping case according to claim 7, the improvement further comprising a pull tab secured to and extending from at least one of the glass sheets having said lubricant material disposed on opposite sides thereof.

9. In a glass shipping case according to claim 7, wherein said lubricant material comprises a lubricant coating applied to opposite sides of at least one of said glass sheets.

10. In a glass shipping case according to claim 9, the improvement further comprising a pull tab secured to and extending from at least one of the glass sheets having said lubricant coating applied thereto.

References Cited

UNITED STATES PATENTS

| | | | |
|---|---|---|---|
| 2,117,194 | 5/1938 | McElroy | 217—36 |
| 2,132,138 | 10/1938 | Williams et al. | 65—24 |
| 2,392,770 | 1/1946 | Ryan et al. | 65—23 |
| 2,476,145 | 7/1949 | Gwyn et al. | 206—62 |
| 2,661,837 | 12/1953 | McCracken | 206—60 |
| 2,812,727 | 11/1957 | Dorsey | 105—367 |
| 2,824,411 | 2/1958 | Goodwillie et al. | 117—124 |
| 2,973,089 | 2/1961 | Brichard et al. | 206—62 |
| 3,301,452 | 1/1967 | Jester | 229—52 |

WILLIAM T. DIXSON, Jr., *Primary Examiner.*